United States Patent [19]

Chucta

[11] Patent Number: 4,837,259
[45] Date of Patent: Jun. 6, 1989

[54] POLYPROPYLENE STABILIZED AGAINST OXIDATIVE DEGRADATION WITH MIXTURES OF DIARYLAMINE DERIVATIVES AND STERICALLY HINDERED PHENOLS

[75] Inventor: Thomas M. Chucta, Naugatuck, Conn.

[73] Assignee: Uniroyal Chemical Company, Inc., Middlebury, Conn.

[21] Appl. No.: 246,893

[22] Filed: Sep. 16, 1988

Related U.S. Application Data

[63] Continuation of Ser. No. 101,310, Sep. 25, 1987, abandoned.

[51] Int. Cl.$^4$ ............................................. C08K 5/18
[52] U.S. Cl. ...................................... 524/258; 524/291; 524/343
[58] Field of Search .................... 524/258, 291, 343

[56]  References Cited
U.S. PATENT DOCUMENTS

| | | | |
|---|---|---|---|
| 3,181,971 | 5/1965 | Rayner | 524/87 |
| 3,285,855 | 11/1966 | Dexter et al. | 524/289 |
| 3,304,283 | 2/1967 | Hawkins et al. | 524/258 |
| 3,432,578 | 3/1969 | Martin | 260/880 |
| 3,452,056 | 6/1969 | Sandholm | 524/258 |
| 3,505,225 | 4/1970 | Wheeler | 524/258 |
| 3,567,664 | 3/1971 | Haring | 260/2.5 |
| 3,637,865 | 1/1972 | Haring | 260/611.5 |
| 3,655,559 | 4/1972 | Holt | 260/45.9 |
| 3,901,849 | 8/1975 | Dodson et al. | 524/87 |
| 3,979,180 | 9/1976 | Lorand | 260/23 |
| 4,007,230 | 2/1977 | Hinze | 260/611.5 |
| 4,341,677 | 7/1982 | Tamosauskas | 523/421 |
| 4,420,579 | 12/1983 | Braid | 524/328 |
| 4,440,671 | 4/1984 | Turbett | 524/258 |
| 4,497,931 | 2/1985 | Hollis | 524/570 |

FOREIGN PATENT DOCUMENTS 59-98148  6/1984  Japan .

OTHER PUBLICATIONS

Gerald Scott-*Developments in Polymer Stabilization*-1, pp. 39,77 to 85,96 and 97 (1979).
*Chem. Abstracts.* 105:61950t (Issue 18, 1986).

*Primary Examiner*—Veronica P. Hoke
*Attorney, Agent, or Firm*—Raymond D. Thompson

[57] ABSTRACT

Polypropylene are stabilized against oxidative degradation by the presence therein of a stabilizing amount of an antioxidant composition which comprises:
(a) at least one aralkyl-substituted diarylamine and;
(b) at least one sterically hindered phenol.

4 Claims, No Drawings

POLYPROPYLENE STABILIZED AGAINST OXIDATIVE DEGRADATION WITH MIXTURES OF DIARYLAMINE DERIVATIVES AND STERICALLY HINDERED PHENOLS

This is a continuation of application Ser. No. 101,310, filed Sept. 25, 1987, now abandoned.

BACKGROUND OF THE INVENTION

This invention relates to polypropylene homopolymers, copolymers and their blends stabilized against oxidative degradation with a combination of at least one diarylamine derivative as hereinafter defined and at least one sterically hindered phenol.

A long-standing problem of plastic goods manufacturers is stabilizing polypropylene resins during high temperature, high shear blending and extrusion processes which are common in plastic goods manufacturing. It has been found that resins that show excellent long-term thermal heat stability characteristics may not be sufficiently protected against the type of degradation which occurs in an extruder during long residence times. The diphenylamine/phenolic blends of this invention have been found to unexpectedly protect the polypropylene against both polymer breakdown, as shown by superior melt flow stability, and against the formation of undesirable color bodies as shown by low color index values.

Aralkyl-substituted diarylamines such as 4,4'-bis(alpha,alpha-dimethylbenzyl)diphenylamine (NAUGARD 445, Uniroyal Chemical) and their use as antioxidants for a variety of polymeric materials are known from U.S. Pat. Nos. 3,452,056 and 3,505,225.

Sterically hindered phenols constitute another known class of antioxidant materials. Antioxidant compositions containing both an amine component and a sterically hindered phenol component, with and without other ingredients, are also known.

Thus, U.S. Pat. No. 3,304,283 discloses an antioxidant composition for mono-olefinic polymers such as polypropylene containing at least one aromatic phenolic thioether, diaryl thioether, aliphatic disulfide, aromatic disulfide, aromatic mercaptan, aliphatic mercaptan and/or aliphatic thiuramdisulfide in combination with at least one biphenol and/or aromatic amine.

U.S. Pat. No. 3,432,578 discloses the stabilization of conjugated diene polymers from the adverse effects of ultraviolet radiation employing a mixture of a diaryl hydroxylamine, 2,6-di-tert-butyl-4-methylphenol, 1,3,5-trimethyl-2,4,6-tris(3,5-di-tert-butyl-4 hydroxylbenzyl)-benzene, dilaurylthiodipropionate and lignin sulfonate.

U.S. Pat. Nos. 3,567,664 and 3,637,865 each describes the stabilization of polyether polyol-based polyurethanes against scorching employing a mixture of 2,6-ditertiary-butyl-4-methyl phenol and a p,p'-dialkyl diphenylamine. Similarly, U.S. Pat. No. 4,007,230 describes the stabilization of polyether polyol-based polyurethanes against scorching employing a composition consisting of certain hindered phenols such as 2,4-dimethyl-6-octyl phenol and 4,4'-bis(alpha,alpha-dimethylbenzyl)diphenylamine (i.e., NAUGARD 445, Uniroyal Chemical, referred to supra).

U.S. Pat. No. 3,655,559 discloses stabilizers for synthetic lubricants based on alkylated diphenylamines and, optionally, any one of numerous other kinds of antioxidants, sterically hindered phenols amongst them.

U.S. Pat. No. 3,979,180 describes the stabilization of low density polyethylene and mineral-filled ethylene vinyl acetate copolymers employing a combination of a sterically hindered phenol and/or a substituted diphenylamine of the structure Ar-NH-Ar' where Ar and Ar' are each phenyl, naphthol, substituted phenyl and naphthol including alkyl substituents of 1-20 alkyl carbon atoms, and halogen, a metal organic thiophosphorus compound and a trace amount of a transition metal salt.

U.S. Pat. No. 4,341,677 describes oil-in-water emulsions of antioxidants useful for treating fibrous reinforcements such as glass fibers to increase the protection of such fiber reinforced polymeric materials as polyolefins, polyurethanes, polyamides, polyesters, polycarbonates, polyacetals, polystyrene and styrene copolymers against chemical degradation. The emulsions are based on hindered phenols such as octadecyl 3-(3',5'-di-tert-butyl-4-hydroxyphenyl-propionate (IRGANOX 1076, Ciba Geigy) and/or diarylamines such as 4,4'-[2-(2-phenyl)-propyl]diphenylamine (NAUGARD 445, Uniroyal Chemical, referred to supra). All of the specific examples of emulsions disclosed to be useful in U.S. Pat. No. 4,341,677 are based either on a sterically hindered phenol or a diarylamine. No example of an emulsion containing both a hindered phenol and a diarylamine is provided.

U.S. Pat. No. 4,420,579 describes antioxidant compositions for polyolefins based on coordination complexes of nickel thiobis(alkylphenolates) with hydroxy-substituted ligands in combination with co-additives such as diarylamines and/or hindered phenols.

U.S. Pat. No. 4,440,671 describes mixtures of hydrocarbon-substituted diphenylamines, e.g., a liquid diphenylamine alkylated with styrene (WINGSTAY 29, Goodyear Tire and Rubber Company) and high molecular weight polyethylene glycols as water-tree retardant compositions for polyethylenes. The compositions can optionally contain antioxidants such as sterically hindered phenols and amines, polymerized 2,2,4-tetramethylhydroquinoline, 4'4'-thio-bis-(6-tert-butyl-3-methylphenol), thiodiethylenebis-(3,5-ditert-butyl-4-hydroxy hydrocinnamate, distearylthiodipropionate, and the like.

The inventor's copending application Ser. No. 941,479, filed Dec. 11, 1986, now abandoned and refiled as Ser. No. 188,149 filed Apr. 27, 1988 discloses mixtures of aralkyl-substituted diarylamines with sterically hindered phenols for stabilization of polyolefins. Specifically preferred is an alpha-methyl styrene substituted diphenylamine, 4,4'-bis(alpha,alpha'dimethylbenzyl)diphenylamine.

SUMMARY OF THE INVENTION

In accordance with the present invention, polypropylene homopolymers, copolymers and blends thereof are stabilized against oxidative degradation by the incorporation therein of a stabilizing amount of an antioxidant composition which comprises:
 (a) at least one diarylamine selected from the group consisting of alkyl-substituted diarylamine and aralkyl-substituted diarylamine;
 (b) at least one sterically hindered phenol.

On a weight-for-weight basis, the foregoing combination of diarylamine derivative(s) and hindered phenol(s) has been found to impart a significantly greater degree of protection to polyolefins against oxidative degradation than either of these materials employed separately.

DESCRIPTION OF THE PREFERRED EMBODIMENTS

The alkyl-substituted diarylamines which are useful in the practice of this invention can be represented by the general formula

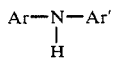

wherein Ar and Ar' each is an aryl radical, at least one of said radicals being substituted with an alkyl radical.

Preferred aralkyl-substituted diarylamines are those disclosed in U.S. Pat. Nos. 3,452,056 and 3,505,225, the disclosures of which are incorporated by reference herein. The preferred aralkyl-substituted diarylamines can be represented by the following general formulas:

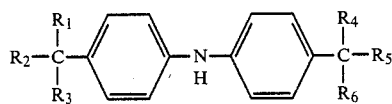

where
- $R_1$ is a phenyl or p-tolyl radical;
- $R_2$ and $R_3$ are selected from methyl, phenyl and p-tolyl radicals;
- $R_4$ is selected from methyl, phenyl, p-tolyl and neopentyl radicals;
- $R_5$ is selected from methyl, phenyl, p-tolyl and 2-phenylisobutyl radicals; and,
- $R_6$ is a methyl radical.

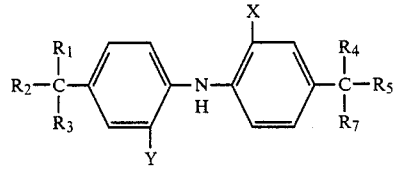

where
- $R_1$ through $R_5$ are selected from the radicals shown in Formula I and $R_7$ is selected from methyl, phenyl or p-tolyl radicals;
- X is selected from the group consisting of the radicals methyl, ethyl, a sec-alkyl containing from three to ten carbon atoms, alpha,alpha-dimethylbenzyl, alpha-methylbenzyl, chlorine, bromine, carboxyl, and metal salts of the carboxylic acids where the metal is zinc, cadmium, nickel, lead, tin, magnesium, or copper; and,
- Y is selected from the group consisting of the radicals hydrogen, methyl, ethyl, a sec-alkyl containing from three to ten carbon atoms, chlorine and bromine.

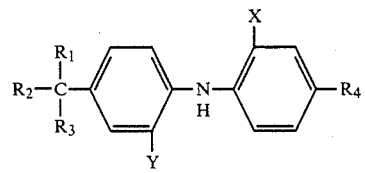

where
- $R_1$ is a phenyl or p-tolyl radical;
- $R_2$ and $R_3$ are selected from methyl, phenyl and p-tolyl radicals;
- $R_4$ is selected from the group consisting of the radicals hydrogen, a primary, secondary and tertiary alkyl containing from one to ten carbon atoms and alkoxyl containing from one to ten carbon atoms which may be straight chain or branched; and,
- X and Y are selected from the group consisting of the radicals hydrogen, methyl, ethyl, sec-alkyl containing from three to ten carbon atoms, chlorine and bromine.

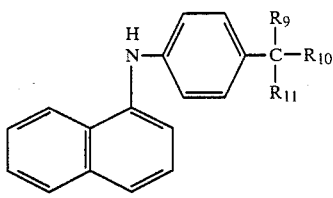

where
- $R_9$ is a phenyl or p-tolyl radical;
- $R_{10}$ is selected from methyl, phenyl p-tolyl and 2-phenyl isobutyl radicals; and,
- $R_{11}$ is selected from methyl, phenyl and p-tolyl radicals.

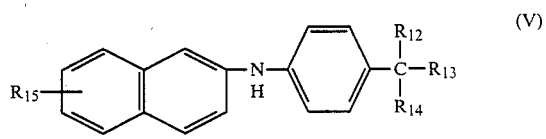

where
- $R_{12}$ is a phenyl or p-tolyl radical;
- $R_{13}$ is selected from methyl, phenyl and p-tolyl radicals;
- $R_{14}$ is selected from methyl, phenyl, p-tolyl and 2-phenylisobutyl radicals; and,
- $R_{15}$ is selected from the group consisting of the radicals hydrogen alpha,alpha-dimethylbenzyl, alpha-methylbenzhydryl, triphenylmethyl and alpha,alpha,p-trimethylbenzyl.

Typical chemicals useful in the invention are as follows:

TYPE I

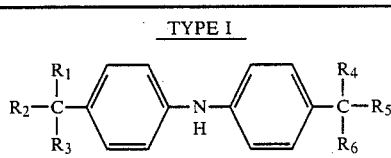

| $R_1$ | $R_2$ | $R_3$ | $R_4$ | $R_5$ | $R_6$ |
|---|---|---|---|---|---|
| Phenyl | Methyl | Methyl | Phenyl | Methyl | Methyl |
| Phenyl | Phenyl | Methyl | Phenyl | Phenyl | Methyl |
| Phenyl | Phenyl | Phenyl | Neopentyl | Methyl | Methyl |
| p-Tolyl | Methyl | Methyl | p-Tolyl | Methyl | Methyl |

TYPE II

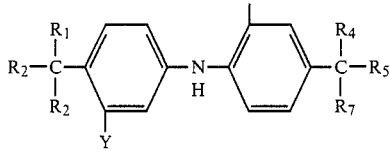

| R₁ | R₂ | R₃ | R₄ | R₅ | R₇ | X | Y |
|---|---|---|---|---|---|---|---|
| Phenyl | Methyl | Methyl | Phenyl | Methyl | Methyl | Alpha,alpha-dimethyl-benzyl | Hydrogen |
| Phenyl | Methyl | Methyl | Phenyl | Methyl | Methyl | Bromo | Bromo |
| Phenyl | Methyl | Methyl | Phenyl | Methyl | Methyl | Carboxyl | Hydrogen |
| Phenyl | Methyl | Methyl | Phenyl | Methyl | Methyl | Nickel carboxylate | Hydrogen |
| Phenyl | Methyl | Methyl | Phenyl | Methyl | Methyl | 2-Butyl | Hydrogen |
| Phenyl | Methyl | Methyl | Phenyl | Methyl | Methyl | 2-Octyl | Hydrogen |
| Phenyl | Phenyl | Phenyl | Phenyl | Phenyl | Phenyl | 2-Hexyl | Hydrogen |

TYPE III

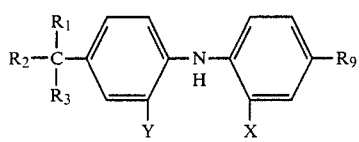

| R₁ | R₂ | R₃ | R₉ | X | Y |
|---|---|---|---|---|---|
| Phenyl | Methyl | Methyl | Isopropoxy | Hydrogen | Hydrogen |
| Phenyl | Methyl | Methyl | Hydrogen | 2-Octyl | Hydrogen |
| Phenyl | Phenyl | Phenyl | Hydrogen | 2-Hexyl | Hydrogen |

TYPE IV

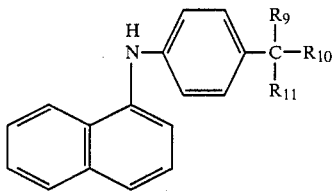

$R_9$ is phenyl and $R_{10}$ and $R_{11}$ are methyl.

TYPE V

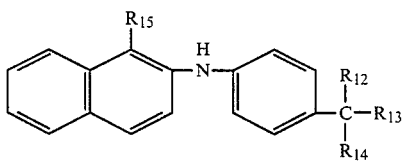

Of the foregoing preferred aralkyl-substituted diarylamines, the substituted diphenylamines of the formula:

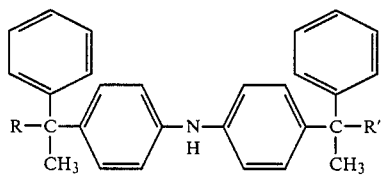

where R and R' are methyl or phenyl are especially preferred. The compound wherein R and R' are methyl is 4,4'-bis-(alpha,alpha-dimethylbenzyl)diphenylamine and the compound in which R and R' are phenyl is 4,4'-bis(alpha-methylbenzyl)diphenylamine.

Sterically hindered phenols which can be used in combination with the foregoing aralkyl-substituted diarylamines include a selected group of high molecular weight sterically hindered phenols heretofore employed as antioxidants/stabilizers.

The diphenylamine-acetone condensation product, identified as NAUGARD A in Examples 21 and 26, is not considered part of this invention because it did not substantially improve the Hunter b color, although it did improve melt flow rate. It is felt that both color and melt stability improvements must be shown in order to consider the results to be synergistic and unexpected.

The aralkyl-substituted diphenylamine (NAUGARD 445) of Example 25 and the aralkyl-substituted diphenylamine (NAUGARD 438) of Example 27 both effected substantial improvements in both melt stability and color values over either the respective diphenylamine or the hindered phenol (IRGANOX 1010) used alone (see values in Examples 19, 20 and 22). This unique and unexpected result allows the polypropylene plastic products manufacturers to protect the base resin against polymer breakdown in the extruder while maintaining excellent color in the finished plastic product.

The useful hindered phenols preferably must have molecular weights above 500. The sulfur-containing thio-phenols are specifically excluded from the term, hindered phenol, as used in this invention. Less preferred are the simple monophenols and bisphenols as: 2,4-dimethyl-6-octyl-phenol; 2,6-di-tert-butyl-4-methyl phenol (i.e., butylated hydroxy toluene); 2,6-ditertiarybutyl-4-ethyl phenol; 2,6-ditertiarybutyl-4-n-butyl phenol; 2,2'-methylenebis(4-methyl-6-tertiarybutyl phenol); 2,2'-methylenebis(4-ethyl-6-tertiarylbutyl-phenol); 2,4-dimethyl-6-tertiarybutyl phenol; 4-hydroxymethyl-2,6-ditertiarybutyl phenol; n-octadecyl-beta(3,5-dditertiarybutyl-4-hydroxyphenyl)propionate; 2,6-dioctadecyl-4-methyl phenol; 2,4,6-trimethyl phenol; 2,4,6-triisopropyl phenol; 2,4,6-tri-tert-butyl phenol; 2-tert-butyl-4,6-dimethyl phenol; 2,6-methyl-4-didodecyl phenol; tris(3,5-di-t-butyl-4-hydroxy isocyanurate, ris(2-methyl-4-hydroxy-5-t-butylphenyl)butane.

More preferred are the high molecular weight hindered phenols having molecular weights above 500. Representative of such high molecular weight materials are: octadecyl-3,5-di-tert-butyl-4-hydroxy hydrocinnamate (NAUGARD 76, Uniroyal Chemical; IRGANOX 1076, Ciba-Geigy); tetrakis[methylene (3,5-di-tert-buty-4-hydroxy-hydrocinnamate)]methane (IRGANOX 1010, Ciga-Geigy),; 2,2'-oxamido bis-[ethyl-3-(3,5-ditertbutyl-4-hydroxyphenyl)propionate (NAUGARD XL-1, Uniroyal Chemical); 1,3,5-tris(4-tert-butyl-3-hydroxy-2,6-dimethylbenzyl)-s-triazine-2,4,6-(1H,3H,5H)trione (CYANOX 1790, American Cyanamid Co.); and 1,3,5-trimethyl-2,4,6-tris(3,5-di-tert-butyl-4-hydroxybenzyl)benzene (ETHANOX 330, Ethyl Corp.); 3,5-di-t-butyl-4-hydroxyhydrocinnamic acid triester with 1,3,5-tris(2-hydroxyethyl)-5-triazine-2,4,6(1H,3H,5H)-trione, bis(3,3-bis(4-hydroxy-3-t-butylphenyl)butanoic acid)glycolester.

More preferred are the hindered phenols having molecular weights above 700. Most preferred are polyphenols which contain three or more substituted phenol groups such as: tetrakis[methylene (3,5-di-tert-buty-4-hydroxy-hydrocinnamate)]methane (IRGANOX 1010, Ciba-Geigy) and 1,3,5-trimethyl-2,4,6-tris(3,5-di-tert-butyl-4-hydroxybenzyl)benzene (ETHANOX 330, Ethyl Corp.).

The thermoplastic polyolefins which are stabilized against oxidative degradation employing mixtures of the foregoing diarylamine derivative(s) and sterically hindered phenols include homopolymers derived from mono- and di-ethylenically unsaturated hydrocarbon monomers of $C_3$ and above such as polypropylene, polyisobutylene, polymethylbutene-1, poly methylpentene-1, polybutene-1, polystyrene, polyisobutylene, and the like; copolymers derived from two or more of monomers such as ethylene-propylene copolymers having at least a majority of propylene, propylene-butene-1 copolymers, propylene-isobutylene copolymers, and blends of a majority of polypropylene with a minority of polyethylene, polypropylene and polybutene-1 and polypropylene and polyisobutylene.

Peroxide-free polyethylene may also be advantageously protected using this antioxidant blend system. The term, peroxide-free, is meant to exclude cross-linked polyethylene materials which utilize organic peroxides as cross-linking agents. The term, non-cross-linked, may also be used for this class of materials. The hindered phenols of the antioxidant blend of this invention interfere with the proper functioning of the peroxides by attacking the peroxide radical and inactivating it. This action is very detrimental to peroxide-containing polyethylene compounds. Accordingly, such peroxide bearing polyethylene materials are specifically excluded but peroxide-free polyethylenes are included under the general terminology of peroxide-free thermoplastic polyolefins.

The foregoing polyolefin homopolymers, copolymers and blends thereof can be combined with minor amounts by weight, i.e., less than about 50 weight percent and preferably less than about 20 weight percent, of one or more compatible or compatibilized polymers other than those mentioned, e.g., polyvinylhalides, chlorinated polyolefins, polyester, polyamides, polyacrylates, and the like.

The combined amounts of diarylamine derivative(s) and sterically hindered phenol(s) incorporated into the foregoing polyolefins will, at a minimum, be that required to impart a significant level of stability against oxidative degradation. In general, such amounts can vary from about 0.01 to about 5.0, and preferably from about 0.1 to about 0.5, weight percent of polyolefin homopolymer, copolymer or polyolefin blend. Although combined amounts of the antioxidants in excess of about 5 weight percent can be employed, such amounts might have a deleterious effect on the physical and mechanical properties of the polyolefin substrate in which case they should ordinarily be avoided.

The relative proportions of diarylamine derivative(s) to sterically hindered phenol(s) can vary widely. In general, the ratios of diarylamine derivative(s) to sterically hindered phenol(s) can vary from about 20:1 to about 1:20 and preferably from about 10:1 to about 1:10 although ratios somewhat above and below the broader of these ranges can also be used with advantageous results.

The procedures employed to incorporate the diarylamine derivative(s) and the sterically hindered phenol(s) into the polyolefin are not critical and in general, follow any of the known procedures for incorporating additives in polyolefin resins. For example, these materials can be introduced into the polyolefin as a premix or they can be maintained separately and added to the polyolefin simultaneously or sequentially and then homogeneously distributed throughout the polymer by milling, extrusion blending or some other mechanical working procedure. Either the dirylamine derivative component(s), the sterically hindered phenol component(s) or both can be added to the polyolefin by way of a preconcentrate or in a carrier system, e.g., in a suitable solvent or co-solvent.

Following common practice, other additives can be introduced into the polyolefin prior to, during and/or following addition of the antioxidants. Such additives include other stabilizers, colorants, reinforcements, fillers, antistatic agents, lubricants, plasticizers, and the like, present in the customary amounts.

The following examples are illustrative of polyolefins stabilized against oxidative degradation by incorporation of a combination of diarylamine derivative(s) and sterically hindered phenol(s) in accordance with this invention.

EXAMPLES 1–12

These examples demonstrate the effect of substituting half the weight of the sterically hindered phenol antioxidants octadecyl-3,5-di-tert-butyl-4-hydroxy hydrocinnamate (NAUGARD 76, Uniroyal Chemical), tetrakis[methylene(3,5-di-tert-butyl-4-hydroxy-hydrocinnamate)]methane (IRGANOX 1010, Ciba-Geigy), 2,2'-oxamido bis-[ethyl-3-(3,5-di-tert-butyl-4-hydroxyphenyl)propionate (NAUGARD XL-1, Uniroyal Chemical), 1,3,5-trimethyl-2,4,6-tris(3,5-di-tert-butyl-4-hydroxybenzyl)benzene (ETHANOX 330, Ethyl Corp.) and 1,3,5-tris(4-tertbutyl-3-hydroxy-2,6-dimethylbenzyl)-a-triazine-2,4,6-(1H,3H,5H)trione (CYANOX 1790, American Cyanamid Co.) with an equal amount by weight of the aralkyl-substituted diarylamine antioxidant 4,4'-bis(alpha,alpha-dimethylbenzyl)diphenylamine (NAUGARD 445, Uniroyal Chemical) on both the melt stability and color stability of polypropylene homopolymer (PRO-FAX 6501, Hercules, Inc.) containing 0.1% by weight of calcium stearate as an acid scavenger.

The foregoing antioxidants/antioxidant compositions were incorporated into the resin in a C.W. Brabender Plasticorder with mixing head attachment and operated for 30 minutes at 25 rpm and a temperature of 210° C.

The effect of the foregoing substitutions on the melt stability of the polypropylene samples (measured as the melt flow rate at 230° C. and 2.16 kg in accordance with ASTM D 1238, Condition L and on the color stability (measured as Hunter b Color carried out upon 65 mil plaques) are set forth below as follows:

TABLE I

MELT AND COLOR STABILITIES OF POLYPROPYLENE CONTAINING STERICALLY HINDERED PHENOL AND/OR ARALKYL-SUBSTITUTED DIARYLAMINE ANTIXOIDANTS

| Example | Phenolic Component/ wt. % | NAUGARD 445, wt. % | Melt Flow Rate (g/10 Min.) | Color Stability (Hunter b Color) |
|---|---|---|---|---|
| 1 | — | — | 13.8 | 2.9 |
| 2 | NAUGARD 76/0.2 | — | 4.2 | 10.7 |
| 3 | NAUGARD 76/0.1 | 0.1 | 2.1 | 6.0 |
| 4 | IRGANOX 1010/0.2 | — | 3.5 | 12.5 |
| 5 | IRGANOX 1010/0.1 | 0.1 | 1.9 | 4.1 |
| 6 | NAUGARD XL-1/0.2 | — | 4.0 | 18.7 |
| 7 | NAUGARD XL-1/0.1 | 0.1 | 2.1 | 9.2 |
| 8 | ETHANOX 330/0.2 | — | 3.6 | 10.8 |
| 9 | ETHANOX 330/0.1 | 0.1 | 2.2 | 5.6 |
| 10 | CYANOX 1790/0.2 | — | 1.9 | 14.2 |
| 11 | CYANOX 1790/0.1 | 0.1 | 2.0 | 13.8 |
| 12 | — | 0.2 | 5.3 | 8.5 |

As these data show, both phenolic antioxidants used alone (Examples 2, 4, 6, 8 and 10) and aralkyl-substituted diarylamine antioxidant used alone (Example 12) resulted in a dramatic increase in stabilization as indicated by a lower melt flow rate compared to the unstabilized polypropylene (Example 1). In all but one of these examples (Example 11), substitution of half the weight of phenolic antioxidant component with aralkyl-substituted diarylamine antioxidant component resulted in still a further sharp reduction in melt flow rate (Examples 3, 5, 7 and 9). These data clearly show the enhanced stabilizing effect of a combination of aralkyl-substituted diarylamine, and sterically hindered phenol(s) compared to stabilization achieved with either material by itself.

Similarly, where color stability is concerned, in all but one case (Example 11), substitution of a part of the phenolic antioxidant with an equal weight amount of aralkyl-substituted diarylamine resulted in a very large increase in color stability (observed as reduced levels of Hunter b color), this being another indication of the enhanced stabilizing effect of mixtures of aralkyl-substituted diarylamine(s) and sterically hindered phenol(s) on polyolefins.

EXAMPLES 13-18

The following examples show the strikingly improved polymer stability realized when the phenolic/amine antioxidant compositions of the instant invention are incorporated in a base resin compared to the more common phenolic/phenolic antioxidant blends of the prior art, specifically illustrated by using IRGANOX 1010 as one of the phenolic antioxidants.

The compositions were prepared and tested in substantially the same manner as those in Examples 1-12 and the data realized are set forth in Table II below. The IRGANOX 1010 when used alone at a weight percent of 0.2 and when in combination, each antioxidant was present at 0.1 wt %, both weight percents being based on the total composition weight.

Table II data clearly shows that Example 18, which is the phenol/amine blend of this invention yields much better melt and color stability than any pair of hindered phenols used in combination.

TABLE II

MELT AND COLOR STABILITIES OF POLYPROPYLENE WITH: (A) PHENOL/PHENOL ANTIOXIDANTS AND (B) SPECIFIC PHENOL/AMINE ANTIOXIDANTS

| Example | Phenolic Component No. 1 | Phenolic Component No. 2 or NAUGARD 445 | Melt Flow Rate (g/10 Min.) | Color Stability (Hunter b Color) |
|---|---|---|---|---|
| 13 | IRGANOX 1010 | — | 3.5 | 12.5 |
| 14 | IRGANOX 1010 | NAUGARD 1076 | 4.1 | 16.6 |
| 15 | IRGANOX 1010 | NAUGARD XL-1 | 3.4 | 17.7 |
| 16 | IRGANOX 1010 | ETHANOX 330 | 3.2 | 16.9 |
| 17 | IRGANOX 1010 | CYANOX 1790 | 2.3 | 13.1 |
| 18 | IRGANOX 1010 | NAUGARD 445 | 1.9 | 4.1 |

EXAMPLES 19-20

The level of stabilization resulting from the incorporation of several known antioxidant compounds in polypropylene (PRO-FAX 6501, Hercules, Inc.) containing 0.1 wt. percent of calcium stearate extrusion aid and a uniform level of 0.2 wt. % antioxidant were evaluated in terms of their effects on the melt stability of the polypropylene samples (measured as the melt flow rate at 230° C. and 2.16 kg in accordance with ASTM D 1238, Condition L) and on the color stability (measured as Hunter b Color carried out upon 65 mil plaques). The "b" color scale was determined according to ASTM D 2244-79 which is incorporated herein by reference.

The mechanism of degradation of the polypropylene polymers is chain scission as defined by higher melt flow rates as the polymer is broken into smaller chains during degradation. Thus, lower melt flow rates indicate that the polypropylene is being protected from degradation. An objectionable change in color stability is demonstrated by increasing "b" values on the Hunter color scale. The lower the b value, the better the color stability.

The antioxidants were incorporated into separate quantities of polypropylene in a C. W. Brabender Plasticorder with mixing head attachment and operated for 30 minutes at 25 rpm and a temperature of 210° C. The individual antioxidants were as follows:

| Example | Chemical Type | Chemical Name | Commercial Source |
|---|---|---|---|
| 19 | sterically hindered phenol | tetrakis [methylene (3,5-di-tert-butyl-4-hydroxy-hydrocinnamate)] methane | IRGANOX 1010, Ciba-Geigy |
| 20 | aralkyl-substituted diarylamine | 4,4'-bis(alpha, alpha-dimethyl-benzyl)diphenyl amine | NAUGARD 445, Uniroyal Chemical |
| 21 | diarylamine-aliphatic ketone reaction product | diphenylamine-acetone condensation reaction product | NAUGARD A, Uniroyal Chemical |
| 22 | alkyl-substituted diarylamine | p,p'-dioctyl-diphenylamine | NAUGALUBE 438, Uniroyal Chemical |
| 23 | diaryl-substituted | N,N'—diphenyl-p-phenylenediamine | NAUGARD J, Uniroyal |

-continued

| Example | Chemical Type | Chemical Name | Commercial Source |
|---|---|---|---|
| | arylenediamine (or, arylamine-substituted diarylamine) | | Chemical |
| 24 | alkyl-substituted diarylenediamine | N,N'—di-sec-butyl-p-phenylenediamine | NAUGALUBE 403, Uniroyal Chemical |

The melt flow rates and Hunter b Color resulting from the presence of the foregoing individual antioxidants in the polypropylene plaques were as follows:

TABLE III

| Example | Comercial Name | Melt Flow Rate | Hunter b Color |
|---|---|---|---|
| Baseline case (no antioxidant) | | 10.2 | 3.4 |
| 19 | IRGANOX 1010 | 2.8 | 13.6 |
| 20 | NAUGARD 445 | 3.4 | 9.6 |
| 21 | NAUGARD A | 1.5 | 28.9 |
| 22 | NAUGALUBE 438 | 5.8 | 11.3 |
| 23 | NAUGARD J | 1.2 | 29.9 |
| 24 | NAUGALUBE 403 | 1.1 | 22.0 |

As expected, each of the foregoing individual antioxidants significantly reduced the melt flow rate of the polypropylene, an indication of an increase in the stabilization to oxidation of each sample compared to the baseline polypropylene sample. However, varying increases in the tendency of a sample of polypropylene to undergo a change in color (as measured by Hunter b Color) were observed compared to the baseline sample.

EXAMPLES 25-29

In accordance with the present invention, one-half the amount of IRGANOX 1010 hindered phenol was replaced with a like amount of each of the foregoing amines, i.e., NAUGARD 445, NAUGARD A, NAUGALUBE 438, NAUGARD J and NAUGALUBE 403. The hindered phenol/amine antioxidant compositions (containing 0.1 wt. % of each antioxidant) were incorporated into individual quantities of the polypropylene and the polypropylene samples were formed into plaques in substantially the same manner as in Examples 19-24.

The effects of the antioxidant compositions on melt flow rate and Hunter b Color measured as in Example 1-6 were as follows (TABLE IV):

TABLE IV

| IRGANOX 1010 BLENDS | | | |
|---|---|---|---|
| Example | Costabilizer | Melt Flow Rate | Hunter b Color |
| 25 | NAUGARD 445 | 1.2 | 4.8 |
| 26 | NAUGARD A | 1.1 | 19.8 |
| 27 | NAUGALUBE 438 | 1.6 | 6.3 |
| 28 | NAUGARD J | 1.2 | 24.6 |
| 29 | NAUGALUBE 403 | 1.2 | 19.2 |

When combined with the hindered phenol antioxidant, the diphenylamine antioxidants generally resulted in a reduction in melt flow rate which was significantly better than that achieved with the diphenyl amine antioxidants alone, i.e., the melt flow rate of the polypropylene samples of the Examples 26 (which does not form a part of this invention) and 25, 27 blends are generally equal to or better than the diphenylamine antioxidants used alone, i.e., Examples 20, 21 and 22.

The phenylene diamine blends with the hindered phenol antioxidant i.e. Examples 28 and 29 resulted in melt flow rates in polypropylene that were merely equal to or worse than the phenylene diamines alone (Examples 23 and 24). Furthermore, the Hunter color value of the phenylene diamine blends remained unacceptably high. Therefore, this class of amines must be excluded from the invention since color was not improved by using these phenylene diamines in a blend with the phenolic.

The diphenylamine-acetone condensation product, identified as NAUGARD A in Examples 21 and 26, is not considered part of this invention because it did not substantially improve the Hunter b color, although it did improve melt flow rate. It is felt that both color and melt stability improvements must be shown in order to consider the results to be synergistic and unexpected.

The aralkyl-substituted diphenylamine (NAUGARD 445) of Example 25 and the aralkyl-substituted diphenylamine (NAUGARD 438) of Example 27 both effected substantial improvements in both melt stability and color values over either the respective diphenylamine or the hindered phenol (IRGANOX 1010) used alone (see values in Examples 19, 20 and 22). This unique and unexpected result allows the polypropylene plastic products manufacturers to protect the base resin against polymer breakdown in the extruder while maintaining excellent color in the finished plastic product.

In view of the many changes and modifications that may be made without departing from principles underlying the invention, reference should be made to the appended claims for an understanding of the scope of the protection afforded the invention.

What is claimed is:

1. A polypropylene composition stabilized against oxidative degradation during mechanical processing comprising polypropylene as the sole high molecular weight polyolefin component, having incorporated therein a stabilizing amount of an antioxidant composition of:
   (a) at least one aralkyl-substituted diarylamine selected from the group consisting of 4,4'-bis-(alpha,alpha-dimethylbenzyl)diphenylamine and 4,4'-bis-(alpha-methylbenzyl)diphenylamine;
   (b) at least one 3,5 di-tertiarybutyl substituted phenol selected from the group consisting of tetrakis(methylene (3,5-di-tertiarybutyl-4-hydroxyhydrocinnamate)methane, octadecyl-3,5-ditertiarybutyl-4-hydroxyhydrocinnamate, and 1,3,5-trimethyl-2,4,6-tris(3,5-ditertiarybutyl-4-hydroxybenzyl)benzene.

2. The polypropylene composition of claim 1 wherein said 3,5-di-tertiarybutyl substituted phenol is tetrakis(methylene (3,5-di-tertiarybutyl-4-hydroxy-hydrocinnamate)methane.

3. The polypropylene composition of claim 1 wherein said antioxidant composition is present at about 0.01 to about 5.0 parts by weight based on the weight of the polypropylene.

4. The polypropylene composition according to claim 1 wherein said aralkyl-substituted diarylamine is 4,4'bis(alpha,alpha dimethylbenzyl)diphenylamine.

* * * * *